United States Patent [19]

Nishimoto et al.

[11] Patent Number: 5,050,429
[45] Date of Patent: Sep. 24, 1991

[54] MICROBRIDGE FLOW SENSOR

[75] Inventors: Ikuo Nishimoto; Takashi Kurosawa; Tomoshige Yamamoto, all of Kanagawa, Japan

[73] Assignee: Yamatake-Honeywell Co., Ltd., Tokyo, Japan

[21] Appl. No.: 482,198

[22] Filed: Feb. 20, 1990

[51] Int. Cl.⁵ .............................................. G01F 1/68
[52] U.S. Cl. ................................... 73/204.26; 73/195
[58] Field of Search ............... 73/195, 204.16, 204.23, 73/204.25, 204.26

[56] References Cited

U.S. PATENT DOCUMENTS 4,733,559  3/1988  Aine et al. .............................. 73/195

Primary Examiner—Herbert Goldstein
Attorney, Agent, or Firm—Blakely, Sokoloff, Taylor & Zafman

[57] ABSTRACT

A microbridge flow sensor includes integral bridge portions and temperature-measuring resistive elements. The bridge portions are integrally formed above the right and left openings of a substrate, respectively. The temperature-measuring resistive elements are respectively formed on the surfaces of the bridge portions.

1 Claim, 3 Drawing Sheets

MICROBRIDGE FLOW SENSOR

BACKGROUND OF THE INVENTION

The present invention relates to a microbridge flow sensor for detecting the flow speed of a very small amount of gas.

A conventional microbridge flow sensor of this type is a flow sensor chip having a thin-film bridge structure having a very small heat capacity, which is formed by a thin-film forming technique and an anisotropic etching technique, as shown in FIGS. 3(a) to 3(b). This sensor has many advantageous features, e.g., a very high response speed, high sensitivity, low power consumption, and good mass productivity.

FIGS. 3(a) and 3(b) show an arrangement of a microbridge flow sensor. FIG. 3(a) is a perspective view of the sensor. FIG. 3(b) is a sectional view taken along a line B–B' in FIG. 3(a). Referring to FIGS. 3(a) and 3(b), a through hole 4 is formed in the central portion of a substrate 1 by anisotropic etching so as to communicate with left and right openings 2 and 3. A bridge portion 5 is integrally formed above the through hole 4 so as to be spatially isolated from the substrate 1 in the form of a bridge. As a result, the bridge portion 5 is thermally insulated from the substrate 1. A thin-film heater element 7 and thin-film temperature-measuring resistive elements 8 and 9 are arranged on the upper surface of the bridge portion 5 such that the element 7 is located between the elements 8 and 9. These elements are covered with a protective film 6. In addition, a peripheral thin-film temperature-measuring resistive element 10 is formed on a corner portion of the substrate 1.

In this arrangement, if the heater element 7 is controlled at a temperature higher than ambient temperature by a predetermined temperature, the temperature distribution near the thin-film bridge portion becomes symmetrical about the heater element 7. If, for example, a gas moves from a direction indicated by an arrow 11 in FIG. 3(a), the upstream side temperature-measuring resistive element 8 is cooled, and heat conduction from the heater element 7 to the downstream side temperature-measuring resistive element 9 is promoted through the flow of the gas as a medium. As a result, the temperature of the element is increased, and a difference in temperature between the elements 8 and 9 appears. If the temperature-measuring resistive elements 8 and 9 formed on both the sides of the heater element 7 are incorporated in a Wheatstone bridge circuit, the temperature difference can be converted into a voltage, and a voltage output corresponding to a flow speed can be obtained. Hence, the flow speed of the gas can be detected, as shown in FIG. 3(c).

In the above-described conventional microbridge flow sensor, however, since the temperature-measuring resistive elements 8 and 9 are arranged on both the sides of the heater element 7 as shown in FIG. 3(a), the following problem is posed when the flow speed of a gas is to be measured by incorporating these elements 8 and 9 into a Wheatstone bridge circuit. As indicated by a characteristic curve A in FIG. 3(c), since the output voltage is increased with an increase in flow speed, a sufficient voltage can be obtained when the flow speed is high. However, when the flow speed is low, the output voltage is decreased, and satisfactory sensitivity cannot be obtained.

SUMMARY OF THE INVENTION

It is an object of the present invention to provide a microbridge flow sensor which can perform measurement in a wide range of flow rates from low to high flow rates.

In order to achieve the above object, according to the present invention, there is provided a microbridge flow sensor including integral bridge portions formed above a surface of a substrate so as to be spatially isolated from the substrate and define a through hole communicating with right and left openings, and a detecting portion constituted by a heating element and temperature-measuring elements which are thermally insulated from surfaces of the bridge portions, the microbridge flow sensor being adapted to detect a flow speed on the basis of changes in resistance of the temperature-measuring elements, wherein the bridge portions are integrally formed above the right and left openings, respectively, and the temperature-measuring resistive elements are respectively formed on the surfaces of the bridge portions.

DETAILED DESCRIPTION OF THE PREFERRED EMBODIMENT

An embodiment of the present invention will be described in detail below with reference to the accompanying drawings.

Figure 1A:
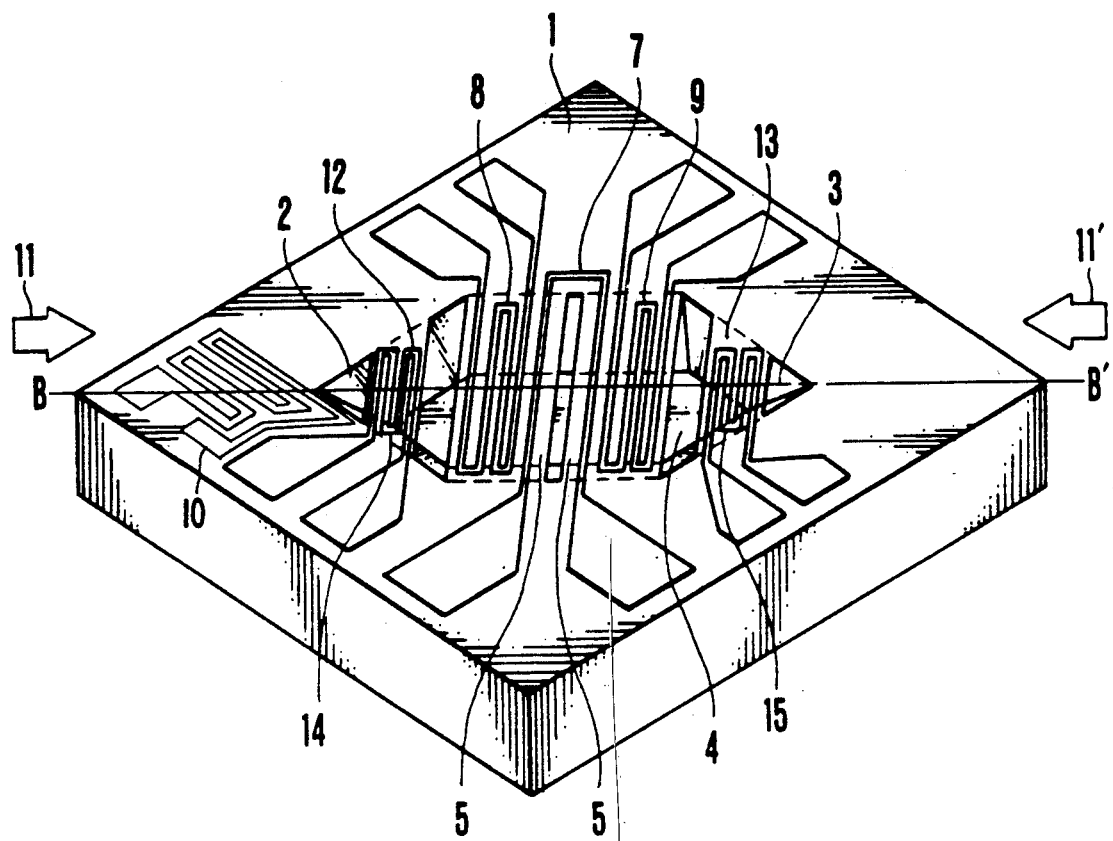
FIG. 1(a) is a perspective view showing a microbridge flow sensor according to an embodiment of the present invention.
Figure 1B:
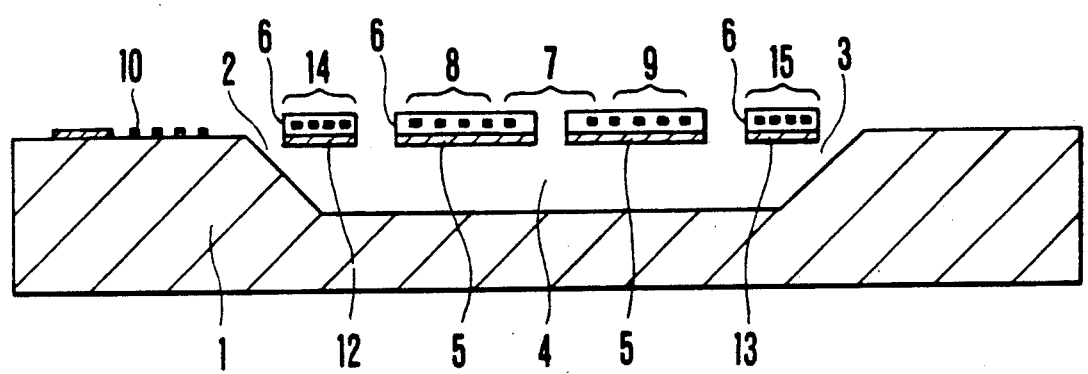
FIG. 1(b) is a sectional view taken along a line B–B' in FIG. 1(a)
Figure 3C:
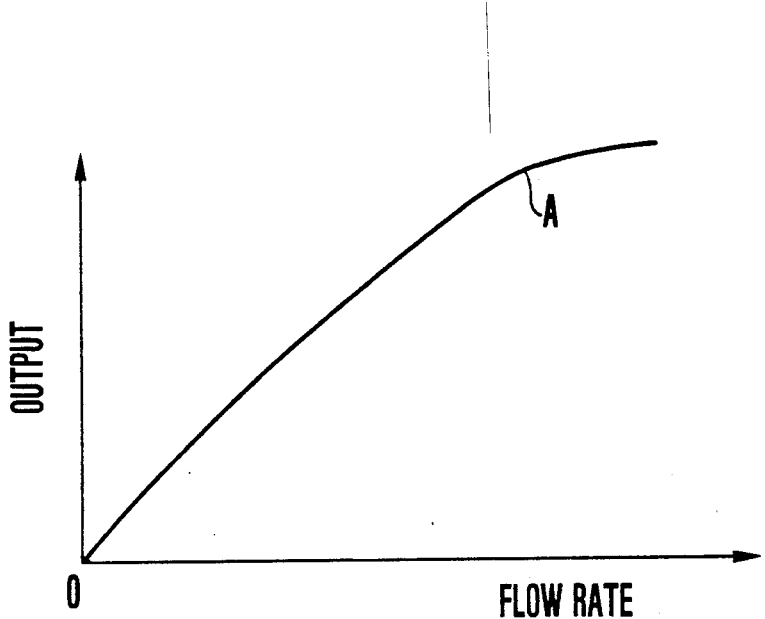
FIG. 3(c) is a graph showing a relationship between a voltage output and a flow speed.
Figure 3A:
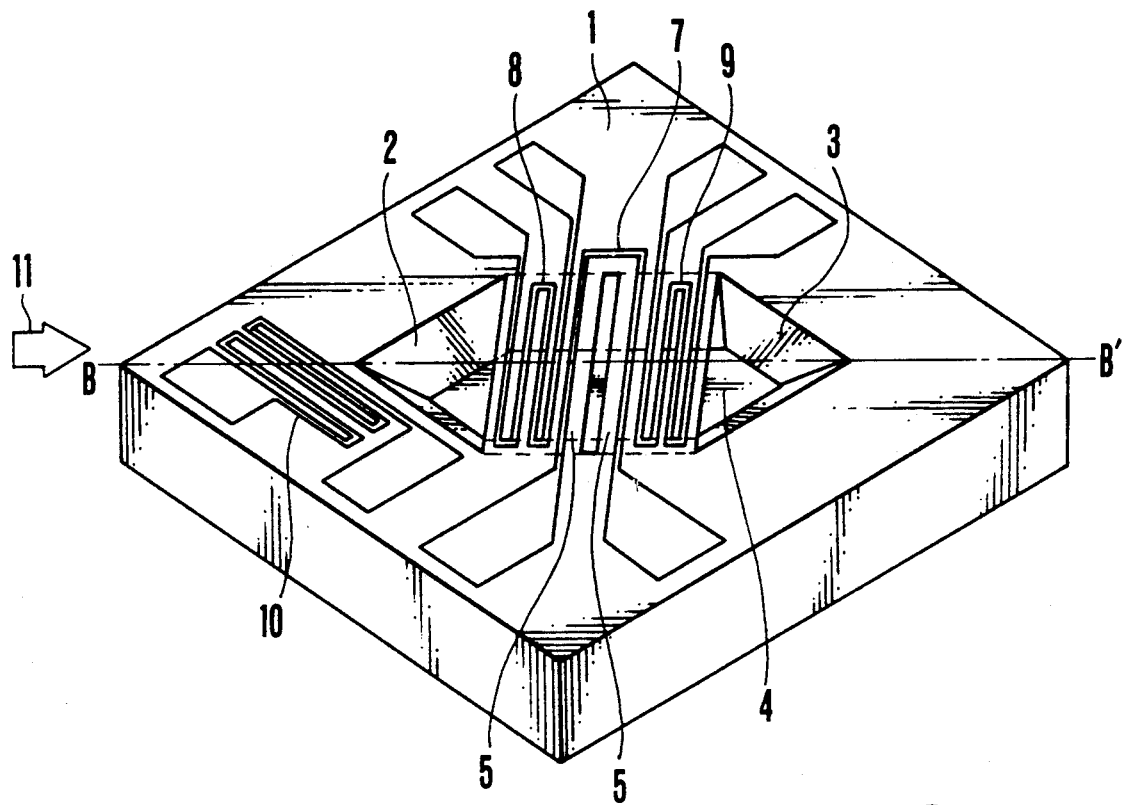
FIG. 3(a) is a perspective view showing an arrangement of a conventional microbridge flow sensor.
Figure 3B:
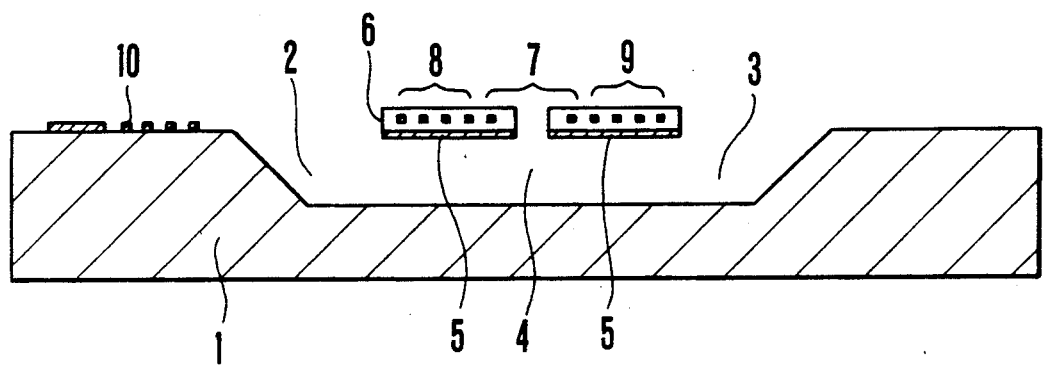
FIG. 3(b) is a sectional view taken along a line B–B' in FIG. 3(b)

FIGS. 1(a) and 1(b) show a microbridge flow sensor according to an embodiment of the present invention. The same reference numerals in FIG. 1(a) and (b) denote the same parts as in FIGS. 3(a) to 3(c). Referring to FIGS. 1(a) and (1b), bridge portions 12 and 13 are formed above openings 2 and 3 of a through hole 4 formed in a substrate 1 so as to be spatially isolated from the substrate 1 in the form of a bridge. As a result, the bridge portions 12 and 13 are thermally insulated from the substrate 1. Thin-film temperature-measuring resistive elements 14 and 15 each covered with a protective film 6 are respectively formed on the upper surfaces of the bridge portions 12 and 13.

Figure 2:
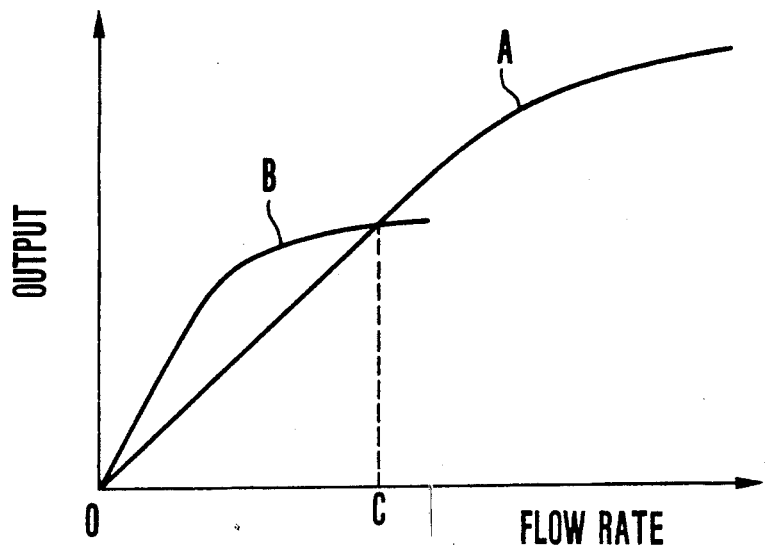
FIG. 2 is a graph showing characteristic curves respectively obtained by the conventional sensor and the sensor of the present invention, each showing a relationship between a flow rate and an output difference.

In this arrangement, the temperature-measuring resistive elements 14 and 15 are formed on the upper surfaces of the bridge portions 12 and 13 above the openings 2 and 3 so as to be thermally isolated from bridge portions 5 on which a heater element 7 is formed. Therefore, the output difference between the temperature-measuring resistive elements 14 and 15 appears as indicated by a characteristic curve B in FIG. 2. Since the elements 14 and 15 are separated from the heater element 7, they are scarcely influenced by heat directly conducted from the heater element 7 through a solid body such as the protective film 6. Heat conduction to the elements 14 and 15 is performed by only a flowing gas. Therefore, the temperature-measuring resistive elements 14 and 15 become sensitive to the flow of a gas, and the detection sensitivity in a range of low flow speed can be improved. For this reason, as indicated by the characteristic curve B in FIG. 2, the sensitivity in the range of low flow speed becomes higher than that represented by a characteristic curve A in FIG. 2 based on the temperature-measuring resistive elements 14 and 15. However, the characteristic curve B in FIG. 2 is saturated as the flow speed is increased. For example, the output represented by the curve B becomes smaller than that represented by the curve A below a flow speed at a point C. Since temperature-measuring resistive elements 8 and 9 are located near the heater element 7, some heat is directly conducted to them through a solid body such as the protective film 6. In the range of low flow speed, temperature changes of both the elements 8 and 9 are small, and hence the detection sensitivity is low. However, as indicated by the characteristic curve A, since sufficient heat conduction is performed, saturation does not occur even if the flow speed is increased. However, the characteristic curve A is saturated beyond a certain range.

If, therefore, the temperature-measuring resistive elements 14 and 15 are used in the range below the flow speed C, and the temperature-measuring elements 8 and 9 are used in the range beyond the flow speed C, the sensitivity of the sensor can be improved even in the range of low flow speed. Hence, flow rate measurement can be performed in a wide range.

As has been described above, according to the present invention, since the bridge portions are respectively formed above the openings of the through hole formed in the substrate, and the temperature-measuring resistive elements are respectively formed on the upper surfaces of the bridge portions, the resistive elements are thermally isolated from the heating element, and saturation of the output difference does not easily occur. Since the temperature-measuring resistive elements are located away from the heater element, the sensitivity in the range in which the flow speed of a gas is low is improved. Therefore, by using these resistive elements together with the temperature-measuring resistive elements located near the heater element, flow rate measurement can be performed in a wide range of flow rates from low to high flow rates.

What is claimed is:

1. A microbridge flow sensor for detecting material flow comprising:
integral bridge portions formed on a surface of a semiconductor substrate so as to be spatially isolated from said semiconductor substrate and defining a through hole passing under the bridge portions communicating a right opening to a left opening; a detecting portion mounted on a surface of the bridge portions including a heating element extending substantially the length of a bridge portion, and temperature-measuring elements which extend alongside the heating element, wherein a first pair of temperature-measuring elements straddle and abut the heating element and a second pair of temperature-measuring elements straddle the heating element and are disposed in a spaced-apart relationship with respect to the heating element, said microbridge flow sensor detecting a flow speed on the basis of changes in resistance of said temperature-measuring elements; and wherein said bridge portions are integrally formed adjacent to the right and left openings, respectively, and substantially at right angles to a direction of flow.

* * * * *